United States Patent
Taga

(10) Patent No.: US 6,644,018 B2
(45) Date of Patent: Nov. 11, 2003

(54) CONTROL SYSTEM FOR INTERNAL COMBUSTION ENGINE

(75) Inventor: Junichi Taga, Aki-gun (JP)

(73) Assignee: Mazda Motor Corporation (JP)

( * ) Notice: Subject to any disclaimer, the term of this patent is extended or adjusted under 35 U.S.C. 154(b) by 23 days.

(21) Appl. No.: 10/073,348

(22) Filed: Feb. 13, 2002

(65) Prior Publication Data

US 2002/0129598 A1 Sep. 19, 2002

(30) Foreign Application Priority Data

Feb. 19, 2001 (JP) ........................................ 2001-041862

(51) Int. Cl.⁷ ................................................ F01N 3/00
(52) U.S. Cl. .............................. 60/285; 60/278; 60/295; 60/301
(58) Field of Search .......................... 60/285, 295, 301, 60/278, 290; 123/295, 305

(56) References Cited

U.S. PATENT DOCUMENTS

| | | | | |
|---|---|---|---|---|
| 5,222,481 A | * | 6/1993 | Morikawa ................... | 123/435 |
| 5,438,968 A | * | 8/1995 | Johnson et al. ............. | 123/446 |
| 6,178,943 B1 | * | 1/2001 | Taga et al. .................. | 123/295 |
| 6,199,534 B1 | | 3/2001 | Tokuyasu et al. | |
| 6,237,328 B1 | * | 5/2001 | Kerns .......................... | 60/283 |
| 6,244,243 B1 | * | 6/2001 | Mamiya et al. ............. | 123/295 |
| 6,257,209 B1 | * | 7/2001 | Hyodo et al. ................ | 123/520 |
| 6,349,698 B2 | * | 2/2002 | Park ............................ | 123/295 |
| 6,446,609 B2 | * | 9/2002 | Mizuno et al. .............. | 123/479 |
| 6,463,906 B2 | * | 10/2002 | Ogawa et al. ............... | 123/295 |
| 6,470,869 B1 | * | 10/2002 | Russell et al. ............... | 123/681 |
| 6,499,456 B1 | * | 12/2002 | Nogi et al. .................. | 123/295 |
| 6,510,834 B1 | * | 1/2003 | Tomita et al. ............... | 123/295 |
| 6,513,484 B1 | * | 2/2003 | Buckland et al. ............ | 123/295 |

* cited by examiner

Primary Examiner—Thomas Denion
Assistant Examiner—Diem T Tran
(74) Attorney, Agent, or Firm—Nixon Peabody LLP; Donald R. Studebaker

(57) ABSTRACT

An engine control unit performs homogeneous charge combustion with a rich air-fuel ratio when a NOx absorption material has absorbed a specified amount of NOx absorption so as to purge NOx and to reduce the NOx with HC and CO in an exhaust gas, thereby purifying the exhaust gas. During execution of the homogeneous charge combustion, a pressure of fuel with which a fuel injector sprays fuel is held at a pressure level for stratified charge combustion immediately before an alteration to the homogeneous charge combustion so as thereby to eliminate an occurrence of a time delay in changing the pressure of fuel upon resumption of the stratified charge combustion from the homogeneous charge combustion executed for NOx purge with an effect of preventing a fuel mixture from falling into the difficulty that the fuel mixture is hard to concentrate locally around a spark plug.

9 Claims, 11 Drawing Sheets

US 6,644,018 B2

CONTROL SYSTEM FOR INTERNAL COMBUSTION ENGINE

BACKGROUND OF THE INVENTION

1. Field of the Invention

The present invention relates to a control system for an internal combustion engine that distributes a fuel mixture directly into a combustion chamber and distributes a stratified fuel mixture locally around a spark plug.

2. Description of Related Art

In the recent years, it is typical in the field of internal combustion engine to change a pressure of fuel that is sprayed directly into a combustion chamber of an internal combustion engine between stratified charge combustion and homogenized charge combustion in order to concentrate a fuel mixture locally around a spark plug during the stratified charge combustion and to promote atomization of a fuel mixture during the homogenized charge combustion. Such an internal combustion engine is known from, for example, Japanese Unexamined Patent Publication 2000-204954.

It is a recent tendency to install a NOx absorbing material in an exhaust system in consideration of an air-fuel ratio that is made lean due to the stratified charge combustion. The NOx absorbing material absorbs NOx in an oxygen excess exhaust gas and purge the NOx as the oxygen concentration of the exhaust gas lowers. Under ordinary stratified charge combustion in which an air-fuel ratio is lean, the NOx absorbing material absorbs NOx in an exhaust gas. When the NOx absorbing material absorbs more than a specified amount of NOx, the fuel combustion is altered in combustion mode from the stratified charge combustion to the homogenized charge combustion in which an air-fuel ratio is rich for a comparatively short period of time so as to lower the oxygen concentration of an exhaust gas. As a result of this, the NOx absorbing material is caused to purge NOx so that the purged NOx is reduced or deoxidized with unburned HC and CO that are increasingly produced through the homogenized charge combustion. Thereafter, when the amount of NOx absorption in the NOx absorbing material is decreased to a satisfactory level, the stratified charge combustion resumes. Accordingly, when the homogenized charge combustion is performed in order to cause the NOx absorbing material to purge NOx, the pressure of a fuel spray is increased to a level meeting a combustion demand. When the stratified charge combustion resumes, the pressure of a fuel spray is decreased so as to meet the stratified charge combustion.

However, when the combustion mode returns to the stratified charge combustion from the homogenized charge combustion after the NOx absorbing material completely purges NOx, a change in the pressure of a fuel spray occurs with a time delay. In this event, the fuel is sprayed with a fuel spray penetration force higher than a primary fuel splay penetration force for the stratified charge combustion, as a result of which a fuel mixture is hard to concentrate locally around the spark plug upon an alteration to the stratified charge combustion from the homogenized charge combustion, so that a satisfactory stratified charge combustion is hardly realized.

SUMMARY OF THE INVENTION

It is an object of the present invention to provide a control system for an internal combustion engine that prevents an occurrence of unsatisfactory stratified charge combustion of a fuel mixture when a combustion mode alteration to stratified charge combustion from homogeneous charge combustion for causing a NOx absorbing material in an exhaust system to purge NOx.

The aforesaid object of the present invention is accomplished by an engine control system for controlling an internal combustion engine that comprises fuel injection means for spraying fuel directly into a combustion chamber, fuel injection pressure control means for controlling a pressure of fuel that the fuel injection means sprays, intake air regulation means disposed in an intake line for regulating an amount of intake air that is introduced into the intake line, NOx absorption means disposed in an exhaust line for absorbing NOx in an exhaust gas at a high oxygen concentration and releasing the NOx in an exhaust gas at a low oxygen concentration, speed monitoring means for monitoring an engine speed of rotation of the internal combustion engine, and control means for controlling the fuel injection means and the fuel injection pressure control means on the basis of the engine speed of rotation.

The control means controls the fuel injection means on the basis of the engine speed of rotation so as to perform homogeneous charge combustion by spraying fuel into the combustion chamber in an intake stroke of a cylinder when the engine speed of rotation is higher than a specified speed of rotation and to perform stratified charge combustion by spraying fuel into the combustion chamber in a compression stroke of the cylinder when the engine speed of rotation is lower than the specified speed of rotation, controls the fuel injection means and/or the intake air regulation means to change an air-fuel ratio during execution of the homogeneous charge combustion so as to provide a rich state wherein an oxygen concentration of an exhaust gas is smaller than that when an air-fuel ratio is equal or nearly equal to a stoichiometric air-fuel ratio, controls the fuel injection pressure control means to control the pressure of fuel according to the engine speed of rotation when the stratified charge combustion is executed and to bring the pressure of fuel to a fixed pressure higher than a pressure of fuel with which the stratified charge combustion is executed when the homogeneous charge combustion is executed, estimates an amount of NOx absorbed in the NOx absorption means; controlling the fuel injection means so as to spray fuel suitably for the homogeneous charge combustion for a specified period of time when it is judged that the amount of NOx has reached a specified amount of NOx during execution of the stratified charge combustion; and controlling the fuel injection pressure control means so as to bring the pressure of fuel provided during execution of the homogeneous charge combustion resulting from the judgment lower than the pressure of fuel provided during execution of the homogeneous charge combustion on the basis of the engine speed of rotation.

According to the engine control system, during execution of the homogeneous charge combustion in order to purge NOx from the NOx absorption material, a change of a pressure of fuel to a demand pressure of fuel of the homogeneous charge combustion is restricted. As the result of the restriction of the pressure change to the demand pressure of fuel of the homogeneous charge combustion, while the NOx absorption material purges NOx into an exhaust gas so as to reduce the NOx and to purify the exhaust gas during execution of the homogeneous charge combustion, a fuel mixture is prevented from becoming apt to fall into the difficulty that the fuel mixture is hard to concentrate locally around a spark plug due to a higher fuel spray penetration force than a primary fuel spray penetration force for the stratified charge combustion that is caused resulting from a time delay in changing the pressure of fuel even upon return to the stratified charge combustion from the homogeneous charge combustion. This causes the stratified charge combustion to be achieved satisfactorily upon resumption of the stratified charge combustion from the homogeneous charge combustion for NOx purge.

The control means may control the fuel injection means during execution of the homogeneous charge combustion resulting from the judgment so as to correct a fuel injection timing at which the fuel injection means sprays fuel according to a pressure difference of the pressure of fuel provided during execution of the homogeneous charge combustion resulting from the judgment from the pressure of fuel provided during execution of the homogeneous charge combustion on the basis of the engine speed of rotation from. This correction of a fuel injection timing prevents deterioration of the combustibility of fuel due to the restriction of the change to the demand pressure of fuel of the homogeneous charge combustion.

The engine control system may further comprise an exhaust gas recirculation line interconnecting an intake line and an exhaust line, and exhaust gas recurculation control means. In this engine control system, the control means controls the exhaust gas recurculation control means so as to bring an amount of exhaust gas that is recirculated during execution of the homogeneous charge combustion resulting from the judgment smaller than an amount of exhaust gas that is recirculated during execution of the homogeneous charge combustion on the basis of the engine speed of rotation. The reduction in the amount of exhaust gas recirculation prevents deterioration of the combustibility of fuel due to the restriction of the change to the demand pressure of fuel of the homogeneous charge combustion.

BRIEF DESCRIPTION OF THE DRAWINGS

The above and other objects and features of the present invention will be clearly understood from the following detailed description when read with reference to the accompanying drawings, wherein the same numeral numbers have been used to denote same or similar parts or mechanisms throughout the drawings and in which.

DETAILED DESCRIPTION OF THE PREFERRED EMBODIMENTS

Figure 1:
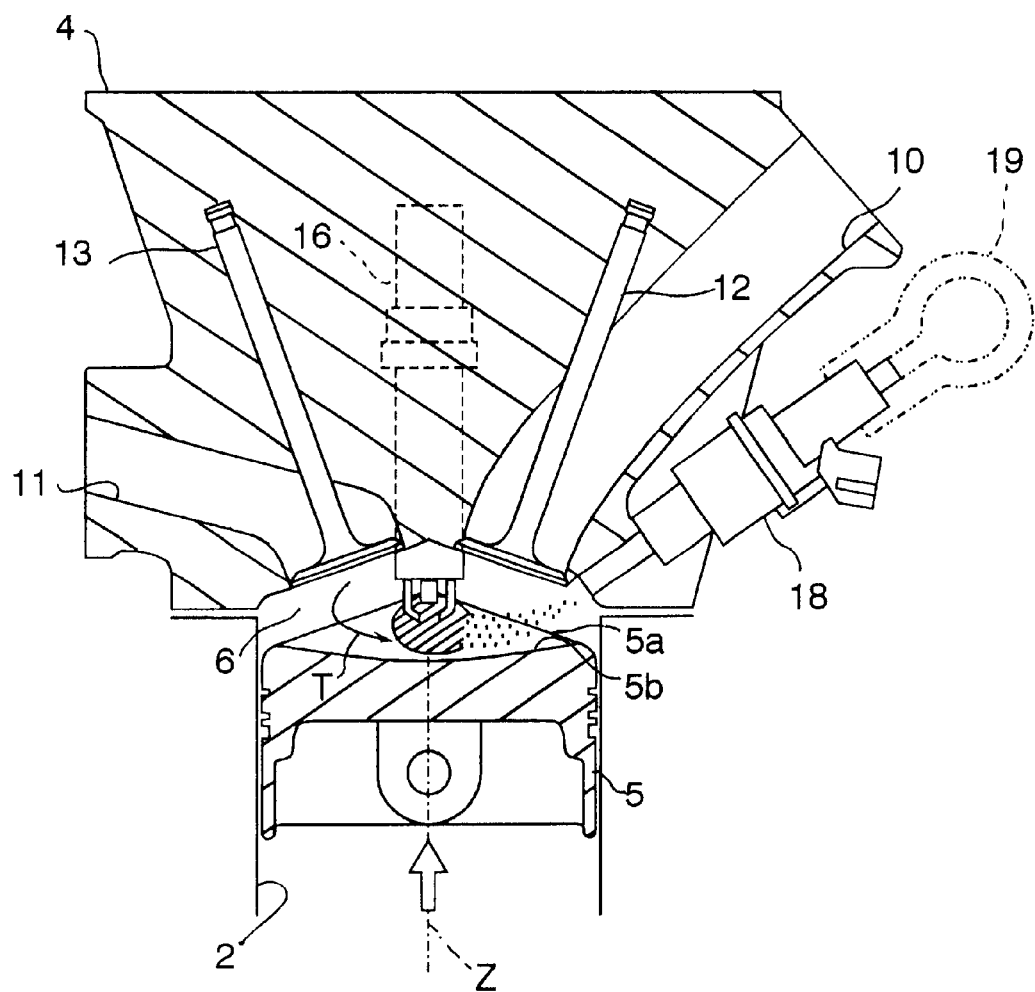
FIG. 1 is a schematic cross-sectional view showing a fuel mixture accumulated locally around electrodes of a spark plug of an internal combustion engine controlled by an engine control system according to an embodiment of the present invention.
Figure 2:
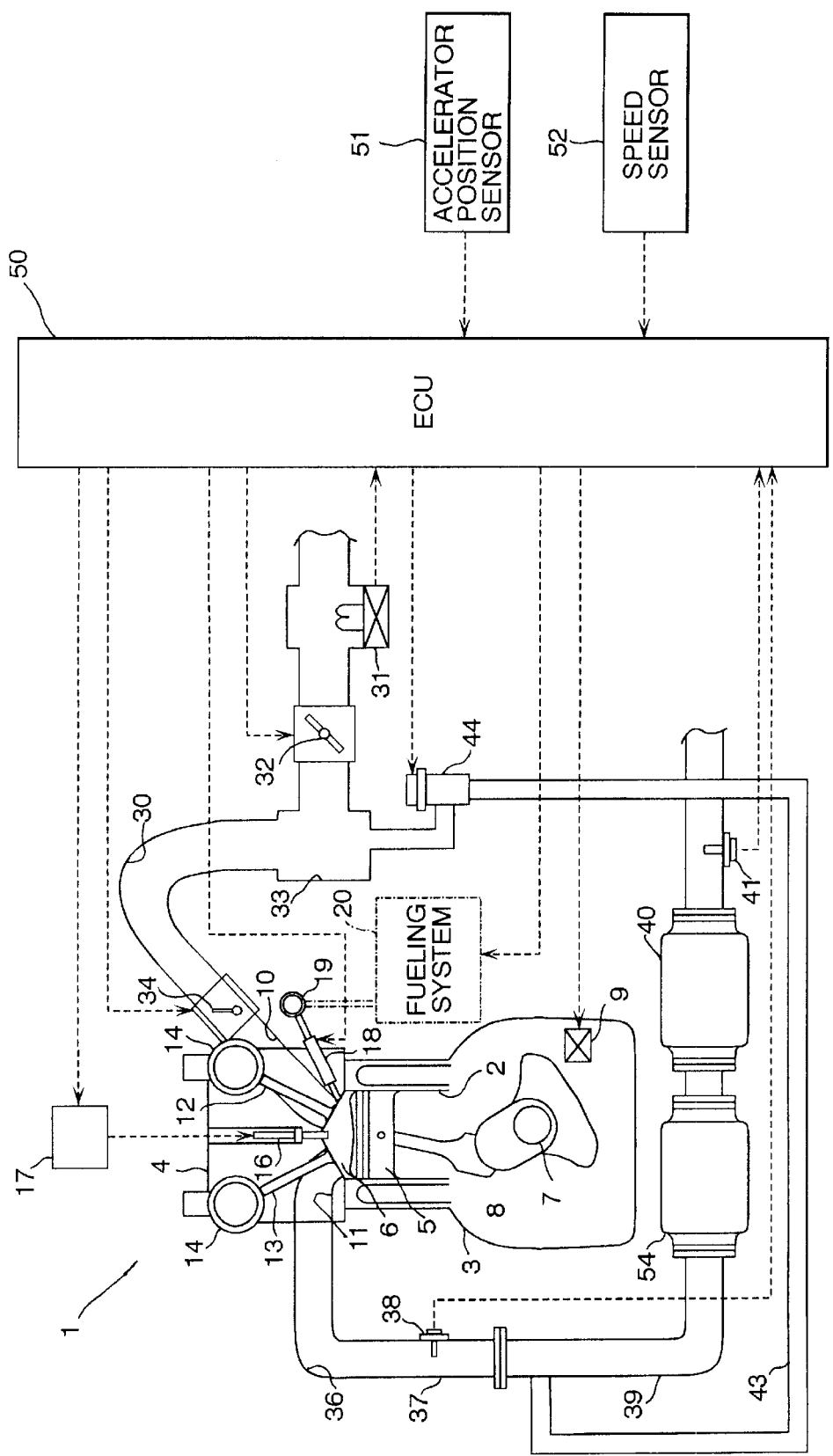
FIG. 2 is an illustration showing the overall structure of the internal combustion engine equipped with the engine control system.
Figure 3:
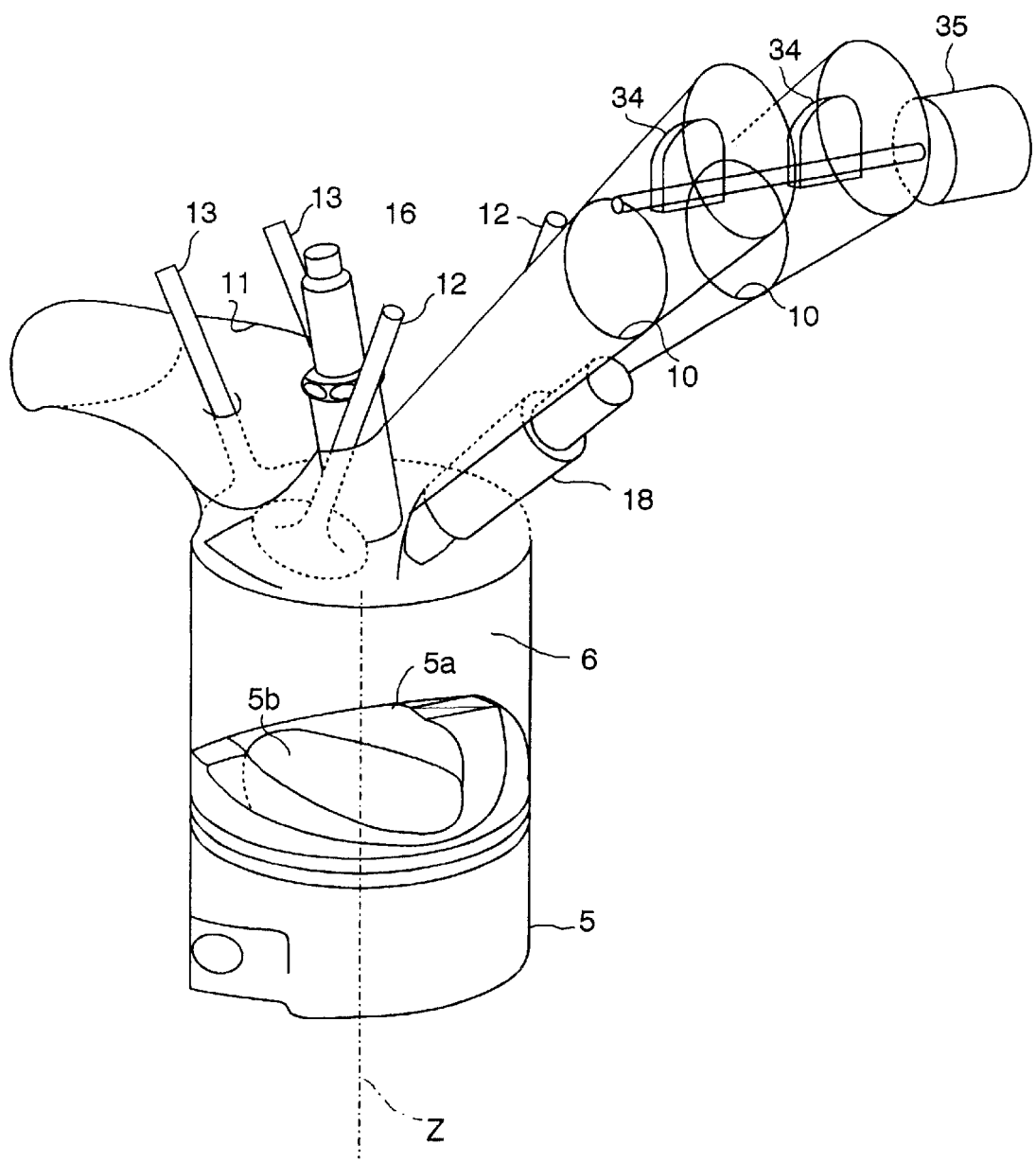
FIG. 3 is a perspective view showing a layout of a piston, intake ports, a spark plug and a fuel injector of the internal combustion engine.

Referring to the drawings in detail and, in particular, to FIGS. 1 to 3 showing an internal combustion engine (which is hereafter referred to as an engine for simplicity) 1 equipped with a control system in accordance with an embodiment of the present invention, the engine 1 comprises a cylinder block 3 having a plurality of cylinders 2 (only one of which is shown) arranged in a straight row and a cylinder head 4 attached to the top of the cylinder block 3. A piston 5 is received in the cylinder 2 for up and down slide reciprocal movement. A combustion chamber 6 is formed between the cylinder wall, the piston and the cylinder head 4. As shown in detail in FIG. 3, the combustion chamber 6 is of the pent-roof type that is formed by two inclined walls formed in the lower wall of the cylinder head 4. As will be described later, the top of the combustion chamber 6 has a wedge configuration meeting a wedge type piston head of the piston 5. A crankshaft 7 is mounted to the cylinder block 3 below the piston 5 and is connected to the piston 5 through a connecting rod 8.

As shown in FIGS. 1 and 2, the cylinder head 4 is formed with two independent intake ports 10 and two independent exhaust ports 11. Each of the intake ports 10 opens at one end to the combustion chamber 6 through one of the inclined walls, extends substantially straight to one of the opposite side walls of the cylinder block 3 and opens at another end to the outside of the cylinder block 3. Intake valves 12 are disposed so as to open and close the one ends of the intake ports 10 at appropriate timings, respectively. Similarly, each of the exhaust ports 11 opens at one end to the combustion chamber 6 through another inclined wall, extends substantially straight to another side wall of the cylinder block 3 and opens at another end to the outside of the cylinder block 3. Exhaust valves 13 are disposed so as to open and close the one ends of the exhaust ports 11 at appropriate timings, respectively. A variable valve drive mechanism 14a drives the intake valves 12 so as to open and close the intake ports 10. Similarly, variable valve drive mechanism 14b drives the exhaust valves 13 so as to open and close the exhaust ports 11.

The engine 1 at one of the opposite sides is provided with an intake pipe 30 so as to communicate with each of the intake ports 10. The intake pipe 30 is provided, from the upstream end to the downstream end, with a hot-wire type air flow sensor 31 operative to monitor a flow rate of intake air, an electrically operated throttle valve 32 operative to regulate an opening of the intake pipe 30 and a surge tank 33. Air is introduced into the combustion chamber 6 of the engine 1 through the intake pipe 30 via an air cleaner (not shown). The electrically operated throttle valve 32 is connected to an accelerator pedal (not shown) and actuated not by a mechanical linkage but by an electric motor (not shown). The intake passage 30 downstream from the surge tank 33 is branched off so as to form common discrete intake pipes for the respective cylinders 2. Each common discrete intake pipes further branches off so as to two discrete intake pipes independently connected to the respective intake ports 10 of each cylinder 2. The respective intake ports 10 at their upstream ends are provided with an air flow regulation valves 34 operative to regulate a tumble flow in the combustion chamber 6, respectively. These air flow regulation valves 34 are opened and closed by a stepping, motor 35. The air flow regulation valve 34 is of a type comprising a round-shaped butterfly diaphragm partly cut away. Specifically, in this embodiment, a lower part of the air flow regulation valve 34 below a valve shaft 34a. When the air flow regulation valve 34 closes the intake port 10, an intake air stream is squeezed passing through an opening formed in the intake port 10 below the tumble regulation valve 34 and enters into the combustion chamber 6 so as to create a strong tumble flow. As the air flow regulation valve 34 is gradually opened, the opening formed in the intake port 10 by the air flow regulation valve 34 is increased, the tumble flow is gradually weakened in strength.

Figure 4:
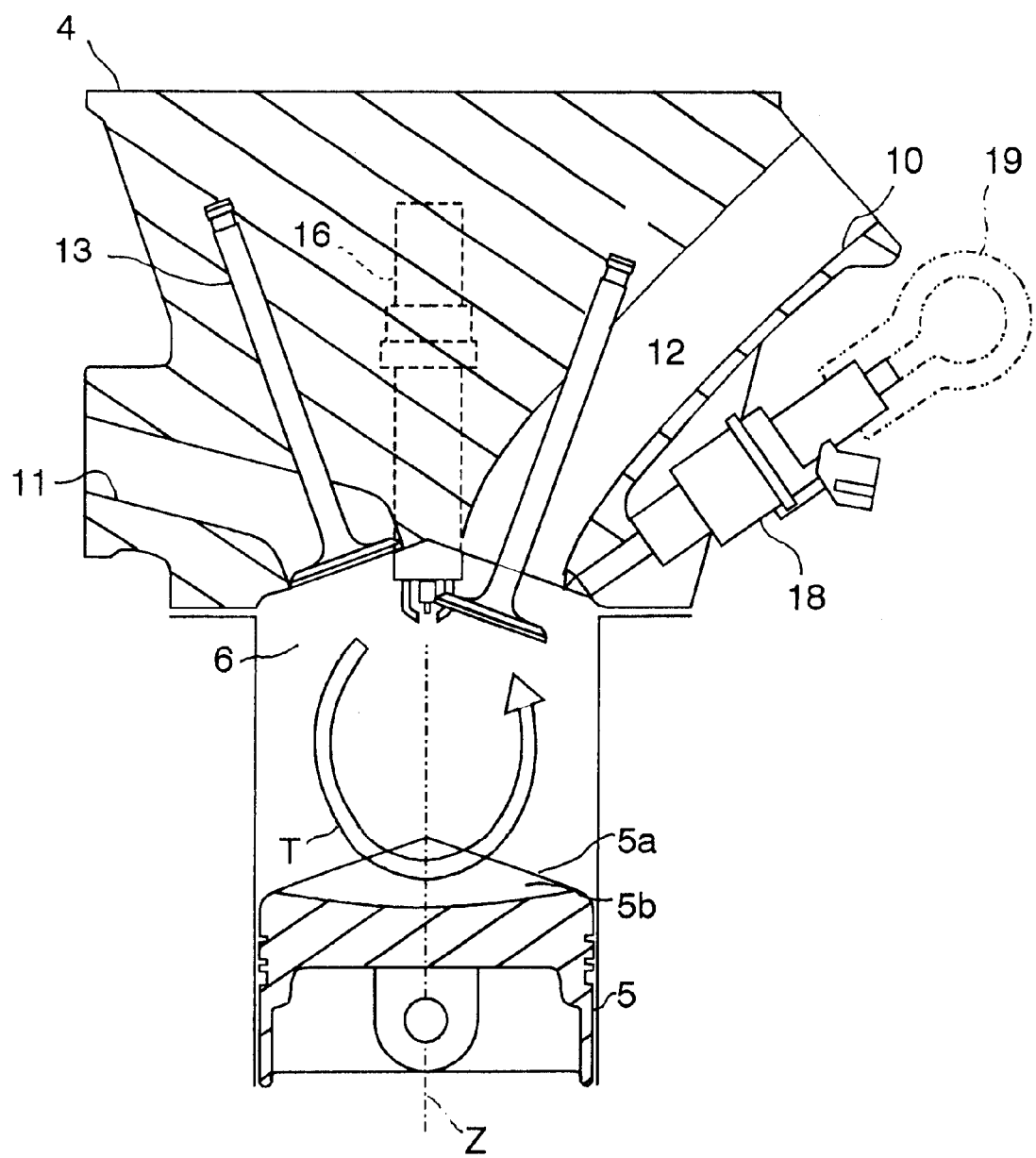
FIG. 4 is a schematic cross-sectional view, similar to FIG. 1, showing a fuel mixture accumulated locally around electrodes of the spark plug of the internal combustion engine in an intake stroke.

The combustion chamber 6 at its top is equipped with a spark plug 16 surrounded by the intake valves 12 and the exhaust valves 13 as shown in FIG. 3. The spark plug design places an electrode tip down by a specified distance into the combustion chamber 16. This places the electrode tip more directly in the path of an incoming fuel mixture. The spark plug 16 at its external end is electrically connected to an ignition circuit 17 (see FIG. 2) The cylinder 2 receives a spark at the plug electrodes at an appropriate timing as the piston 5 nears the end of its compression stroke. A piston head 5a of the piston 5 is of a wedge type and meets in configuration the top of the pent-roof type the combustion chamber 6. The piston head 5a at its center is formed with a lemon-shaped recess 5b. As shown in FIG. 4, this recess 5b functions to form a smooth tumble flow T in the intake stroke in the combustion chamber 6 and reliably holds so as to prevent the tumble flow T from damping so much until a later stage of the compression stroke.

The combustion chamber 6 at its skirt is provided with a fuel injection means 18 disposed between near downstream ends of the intake ports 10. The fuel injector 18 is of the swirl type well known in the art that injects fuel in the form of hollow corn-shaped swirl flow extending along a center line of the fuel injector 10. As is well known, when rising a pressure of fuel that is injected through the fuel injector 18 (which is hereafter referred to as a fuel injection pressure), the fuel spray gains an increase in fuel spray penetration force according to the rise in the fuel injection pressure. A fuel distribution pipe 19 extends aside the cylinder head 4 and is commonly connected to the fuel injectors 18 for the cylinders 2 so as to deliver pressurized fuel to the respective fuel injectors 18 from a fueling system 20 shown in FIG. 5A or 5B.

Figure 5A:
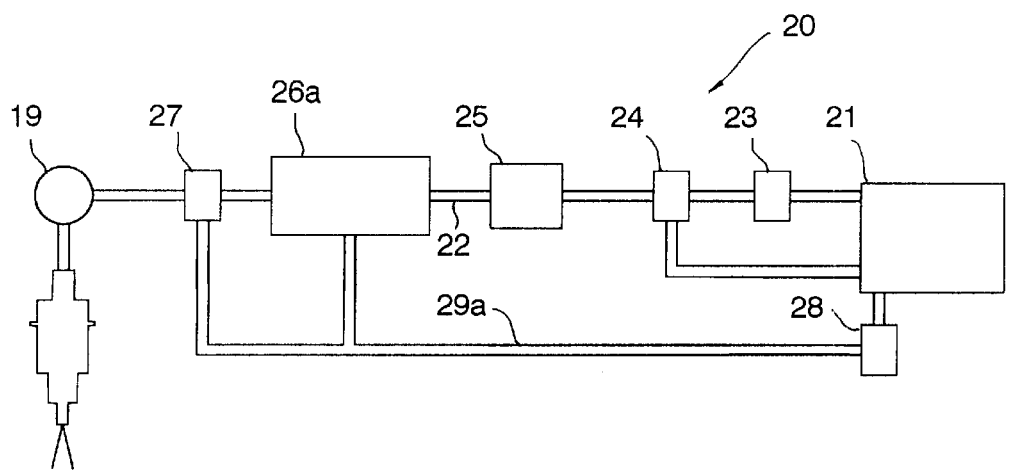
FIG. 5A is a schematic illustration showing a fueling system by way of example.

The fueling system 20 may take a form shown in FIG. 5A. The fueling system 20 includes the fuel distribution pipe 19 and a fuel tank 21 connected through a fuel pipe 22. This fuel pipe 22 is provided from the side of the fuel tank 21 to the fuel distribution pipe 19 with a low-pressure fuel pump 23, a low-pressure regulator 24, a fuel filter 25, a high-pressure fuel pump 26a and a high-pressure regulator 27. These high-pressure fuel pump 26a and high-pressure regulator 27 are connected to the fuel tank 21 through a return pipe 29a. The return pipe 29a is provided with a low-pressure regulator 28 that operates to regulate a pressure of the fuel returning to the fuel tank 21. The fuel pumped by the low-pressure fuel pump 23 is regulated in pressure by the low-pressure regulator 24 and then sent to the high-pressure fuel pump 26a through the fuel filter 25. The high-pressure fuel pump 26a pressurizes the fuel and sends it partly into the fuel distribution pipe 19 through the high-pressure regulator 27 and returns it partly to the fuel tank 21 through the low-pressure regulator 28. The fuel sent into the fuel distribution pipe 19 is regulated to an appropriate pressure level between, for example, approximately 3 Mpa and approximately 13 Mpa, and, more desirably approximately 3 Mpa and approximately 17 Mpa, for the stratified charge combustion.

Figure 5B:
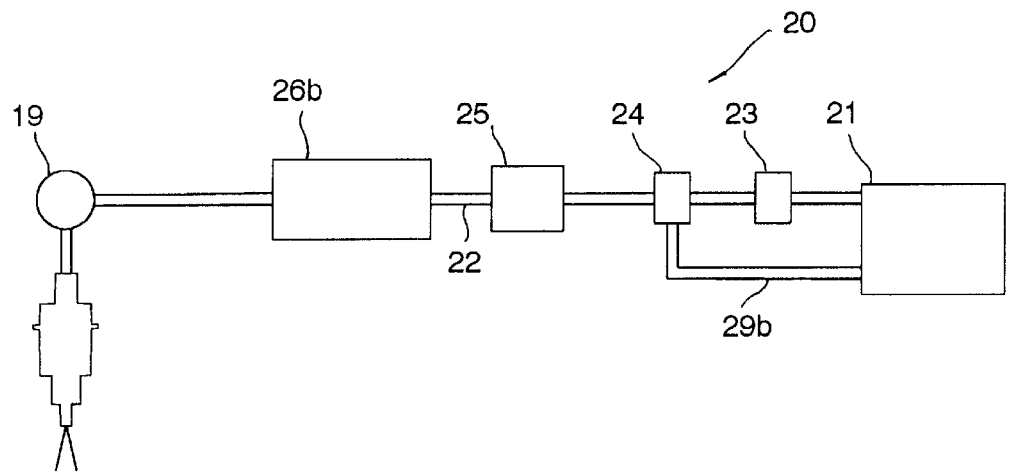
FIG. 5B is a schematic illustration showing another fueling system by way of example.

The fueling system 20 may take another form shown in FIG. 5B. A fueling system 20 includes the fuel distribution pipe 19 and a fuel tank 21 connected through a fuel pipe 22. This fuel pipe 22 is provided from the side of the fuel tank 21 to the fuel distribution pipe 19 with a low-pressure fuel pump 23, a low-pressure regulator 24, a fuel filter 25 and an electric motored high-pressure fuel pump 26b that is of electric motored type and variable in discharge rate over a wide range. The low-pressure regulator 24 is connected to the fuel tank 21 through a return pipe 29 so as to return fuel partly to the fuel tank 21. The high-pressure fuel pump 26b regulates a discharge amount of fuel to the fuel distribution pipe 19 so as thereby to regulate a pressure of the fuel.

The engine 1 at another side is provided with an exhaust manifold 37 connected at an upstream end to the respective exhaust ports 11 of the cylinders 2 through discrete intake pipes 36 and connected at downstream end to a common exhaust pipe 29. The exhaust manifold 37 is provided with a linear oxygen sensor ($O_2$ sensor) 38 that is well known in various forms and may take any well known form. As well known in the art, the $O_2$ sensor 38 monitors an oxygen concentration of an exhaust gas discharged from the engine 1 and provide a linear output within a specified range of air-fuel ratio including a stoichiometric air-fuel ratio. The exhaust pipe 39 is provided, from the upstream end to the downstream end, with a three-way catalytic converter 54, a NOx absorbing unit 40 containing a NOx absorbing material and a lambda oxygen sensor ($\lambda O_2$ sensor) 41. The NOx absorbing material is of a NOx absorbing/reducing type that absorbs NOx in an exhaust gas at a high oxygen concentration and purges the NOx and reduces or deoxidizes the NOx with unburned HC and CO when the oxygen concentration lowers. The $\lambda O_2$ sensor 41, that is known in various form and may take any well known form, monitors an oxygen concentration of an exhaust gas discharged from the engine 1 in order to detect deterioration of the NOx absorbing material and provide a step output reversed at a stoichiometric air-fuel ratio as a boundary.

There is further installed an exhaust gas recirculation (EGR) pipe 43 connected between the intake pipe 36 and the exhaust pipe 39. Specifically, the EGR pipe 43 at its downstream end is connected to the intake pipe 36 between the throttle valve 32 and the surge tank 33 and provided with an exhaust gas recirculation (EGR) valve 44. This EGR valve 44 regulates an amount of exhaust gas that is recirculated into an intake air stream through the EGR pipe 43.

Figure 6:
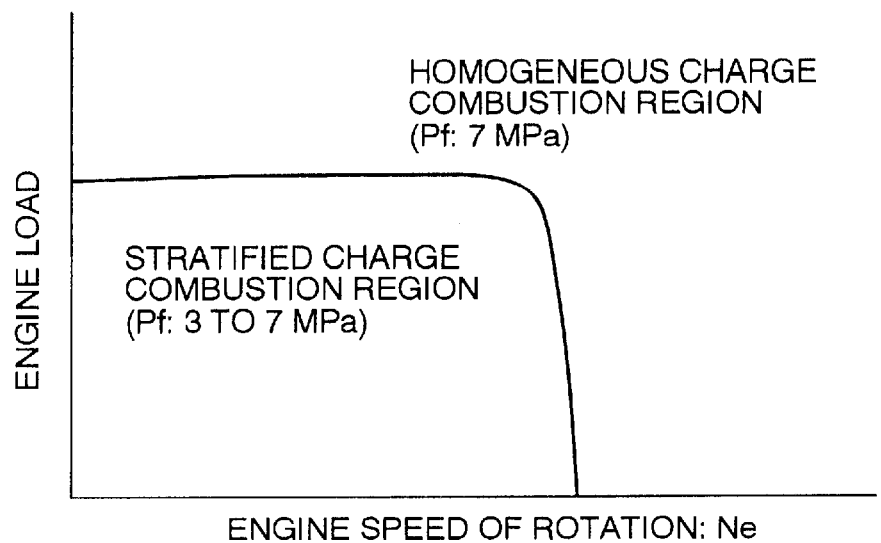
FIG. 6 is a diagrammatical illustration showing a control map of engine operating regions for stratified charge combustion and homogeneous charge combustion, respectively.

An engine control unit (ECU) 50 controls various operative elements, namely the ignition circuit 17, the fuel injector 18, the high-pressure regulator 27 of the fueling system 20, the electrically operated throttle valve 32, the air flow regulation valve 34, the EGR valve 44 and the like. In order for the ECU 50 to perform precise control of the operative elements, the ECU 50 receives signals from at least an angle sensor 9 operative to monitor a rotational angle of the crankshaft 7, a accelerator position sensor 51 and a speed sensor 52 operative to monitor a rotational speed of the crankshaft 7 substitute for an engine speed, in addition to the air flow sensor 31, the linear $O_2$ sensor 38 and the $\lambda O_2$ sensor 41. The ECU 50 provides control signals for controlling an amount of fuel injection, a fuel injection timing and a fuel injection pressure according to an engine operating condition that is determined on the basis of the incoming signals. Specifically, as shown in FIG. 6 by way of example, a region of engine operating condition for the stratified charge combustion is defined on the side of lower engine speed and engine load while the engine 1 operates under a warm condition. In this stratified charge combustion region of engine operating condition, the fuel injector 18 is activated to spray fuel in a specified period of time in the compression stroke of the piston 2, for example at a point of time between 40° and 140° after a top dead center (ATDC) of the compression stroke of the piston 5 so that a stratified fuel mixture is distributed locally around the spark plug 16 fort he stratified charge combustion. On the other hand, the remaining region of engine operating condition is allocated to the homogenized charge combustion. In this homogenized charge combustion region of engine operating condition, the fuel injector 18 is activated to spray fuel in the intake stroke of the piston 5 so as to mix sufficiently with intake air, thereby distributing a homogeneous fuel mixture in the combustion chamber 6. During the homogeneous charge combustion, the control of fuel injection and throttle opening is made so as to provide an approximately stoichiometric air-fuel ratio, i.e. approximately 14.7, over an entire region of engine operating condition. In particular, under a full throttle engine operating condition, the control is made to enrich the fuel mixture to an air-fuel ratio of, for example, approximately 13 that is richer than the stoichiometric air-fuel ratio, so as thereby to provide a high engine output meeting a high engine load.

In the stratified charge combustion region of engine operating condition, appropriate stratification of a fuel mixture is attained using a tumble flow T for controlling the behavior of a fuel spray in the combustion chamber 6. Specifically, when the engine 1 operates in the stratified charge combustion region of engine operating condition, while the tumble flow T created in the intake stroke of the piston 5 is held until a later stage of the compression stroke of the piston 5, fuel is sprayed so as to run into the tumble flow T just in a direction approximately opposite to the tumble flow T. This cause the tumble flow T to affect the fuel spray so as thereby to make the fuel spray slow down and move gradually toward the spark plug 16. This movement of the fuel spray promotes vaporization and atomization of fuel drops and mixing with air. Finally, as shaded in FIG. 1, the fuel mixture accumulates as a combustible fuel mixture locally around the spark plug 16 at the point of time of ignition.

Figure 7A:
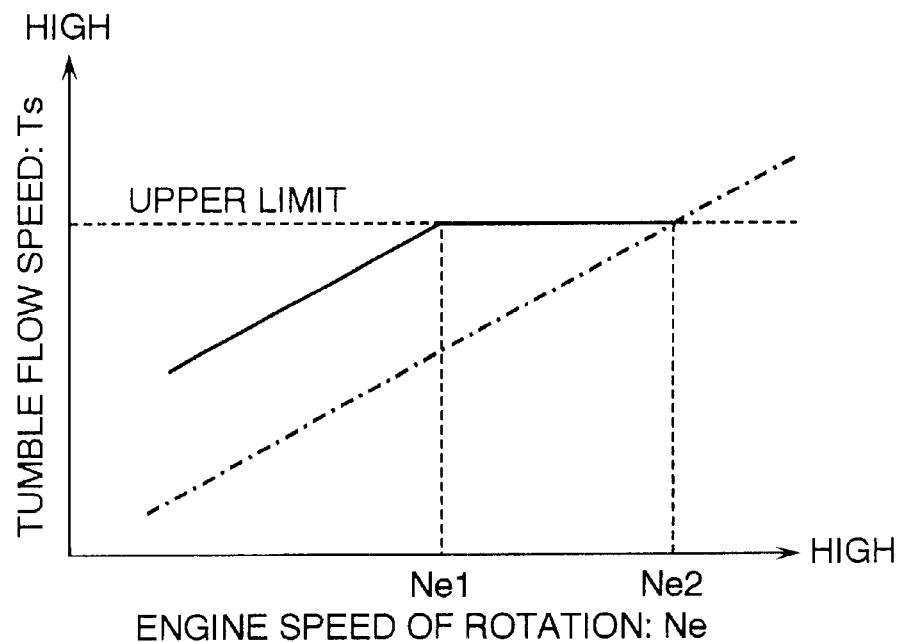
FIG. 7A is a control map of fuel injection pressure with respect to engine speed of rotation.

In this instance, while the air flow regulation valves 34 is controlled in opening according to a change in engine speed so as to vary a speed of the tumble flow T in the combustion chamber 6, the fuel injector 18 is controlled so as to regulate the fuel injection pressure correspondingly to the change in opening of the air flow regulation valves 34. Describing the control of tumble speed more specifically, as shown in FIG. 7A, when the engine 1 operates in the stratified charge combustion region of engine operating condition, the air flow regulation valves 34 remains fully closed until the engine speed Ne reaches a first specified speed Ne1, for example 2,500 rpm. As a result of this, the tumble speed Ts is above than that for an event where the air flow regulation valves 34 is fully opened (shown by a broken line) and varies higher with an increase in engine speed Ne. When the engine speed Ne reaches the first specified speed Ne1, the tumble speed Ts reaches a specified upper limit speed Tsup. Thereafter, when the engine speed Ne further increases exceeding the first specified speed Ne1, the air flow regulation valves 34 is gradually opened according to a change in opening of the air flow regulation valves 34 so that the tumble speed Ts remains unchanged. When the engine speed Ne further increases exceeding the first specified speed Ne1. When the engine speed Ne reaches a second specified speed Ne2, for example 3,500 rpm, the air flow regulation valves 34 is fully opened. Thereafter, when the engine speed Ne increases exceeding the second specified speed Ne2 and enter the homogeneous charge region of engine operating condition, the air flow regulation valves 34 remains fully opened to assure a sufficient amount of intake air.

Figure 7B:
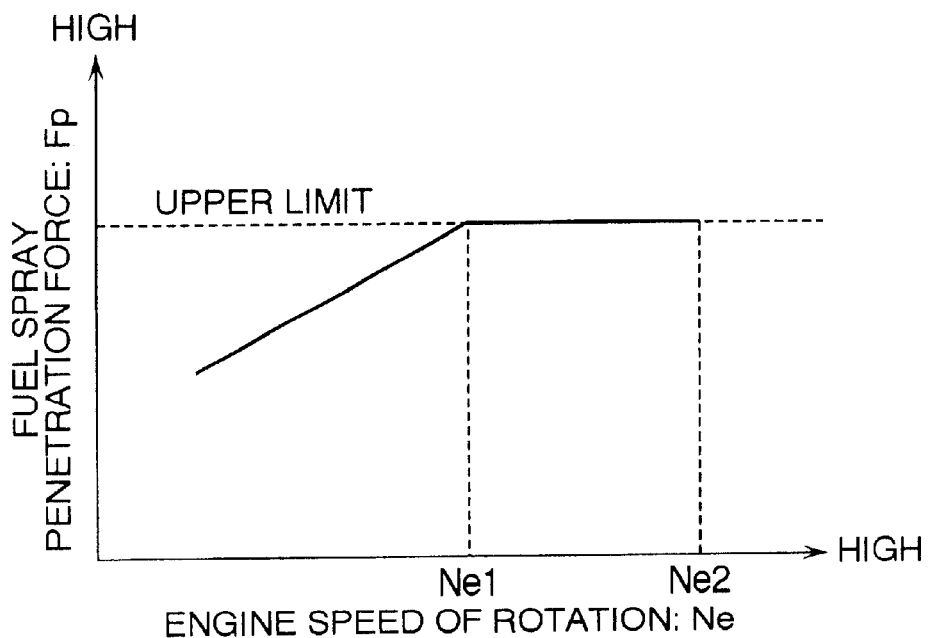
FIG. 7B is a control map of fuel spray penetration force with respect to engine speed of rotation.

Simultaneously, the fuel injection pressure is controlled so as to accord the change in tumble speed, thereby varying the fuel spray penetration force Fp as shown in FIG. 7B. Specifically, when the engine 1 operates in the stratified charge combustion region of engine operating condition, the fuel spray penetration force Fp is increased to a specified upper limit of penetration force Fpup until the engine speed Ne reaches then the first specified speed Ne1. While the engine speed Ne changes between the first specified speed Ne1 and the second specified speed Ne2, the fuel spray penetration force Fp is kept constant at the upper limit of fuel spray penetration force Fpup. When the engine speed Ne further increases exceeding the second specified speed Ne2 and enter the homogeneous charge region of engine operating condition, the fuel spray penetration force Fp is fixed at a value higher than the upper limit of penetration force Fpup for the stratified charge combustion or is determined according to a balance between an amount of fuel injection and a period of time for which fuel injection can be made.

Figure 8:
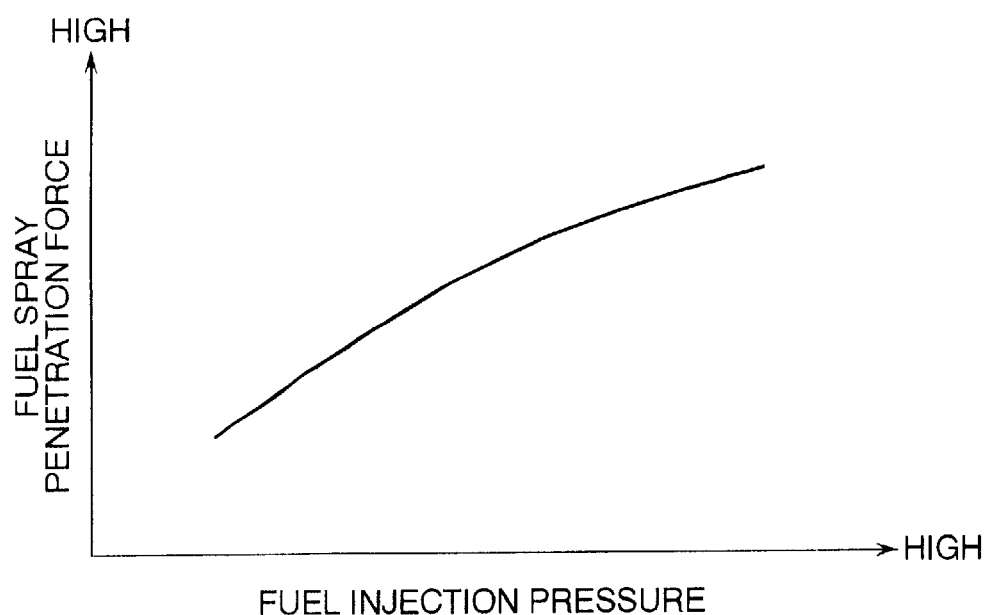
FIG. 8 is a control map of the relationship between fuel spray penetration force and fuel injection pressure.

The control of fuel spray penetration force Fp is achieved by controlling the high-pressure fuel pump 27 of the fueling system 20 so as to vary the pressure of fuel that is delivered to the fuel injector 18. The control of the high-pressure fuel pump 27 is performed according to a programmed control sequence. Because there is an unconditional relationship between fuel spray penetration force and fuel injection pressure such as shown in FIG. 8, the control of fuel injection pressure is practically performed so as to satisfy the relationship between engine speed and fuel spray penetration force defined as shown in FIG. 7B in consideration of the relationship between fuel spray penetration force and fuel injection pressure shown in FIG. 8.

Figure 9A:
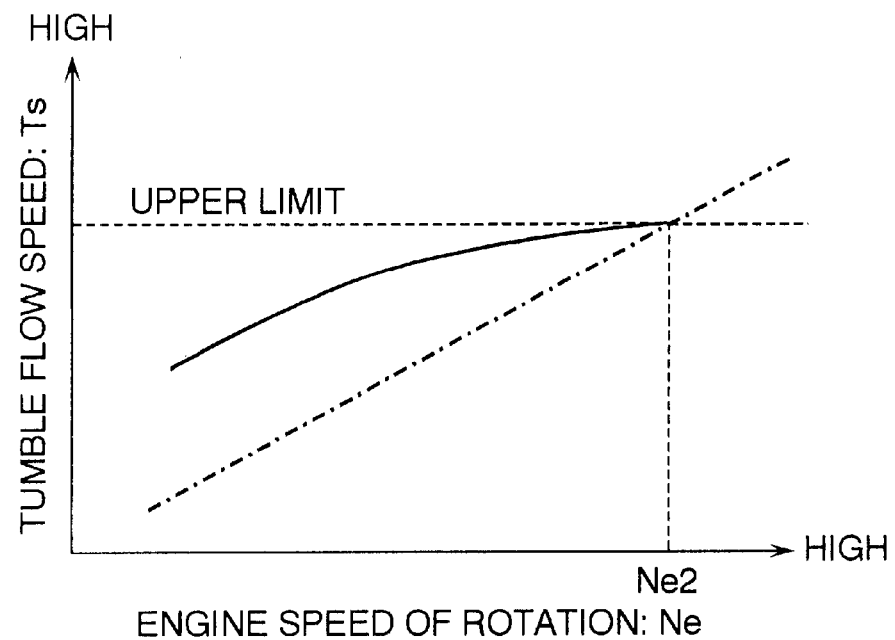
FIG. 9A is another control map of fuel injection pressure with respect to engine speed of rotation.
Figure 9B:
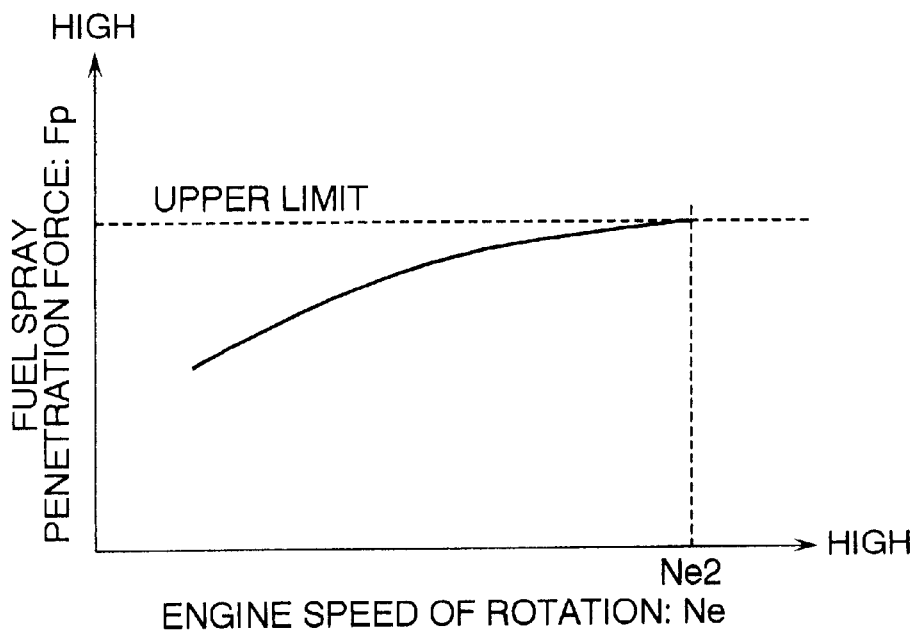
FIG. 9B is another control map of fuel spray penetration force with respect to engine speed of rotation.

In this instance, the control of tumble speed may be performed such as shown in FIG. 9A. The air flow regulation valves 34 is gradually opened greater with an increase in engine speed Ne until the engine speed Ne reaches the second specified speed Ne2 so as to gradually higher the tumble speed Ts within the region below the specified upper limit speed Tsup. The control of fuel spray penetration force Fp is achieved by controlling the high-pressure fuel pump 27 of the fueling system 20 so as to vary the fuel injection pressure. This control is practically performed so as to satisfy the relationship between engine speed and fuel spray penetration force defined as shown in FIG. 9B in consideration of the relationship between fuel spray penetration force and fuel injection pressure shown in FIG. 8.

The ECU 50 performs NOx purge combustion control as described below with reference to FIG. 10 in addition to the fuel pressure control according to the regions of engine operating condition.

Figure 10:
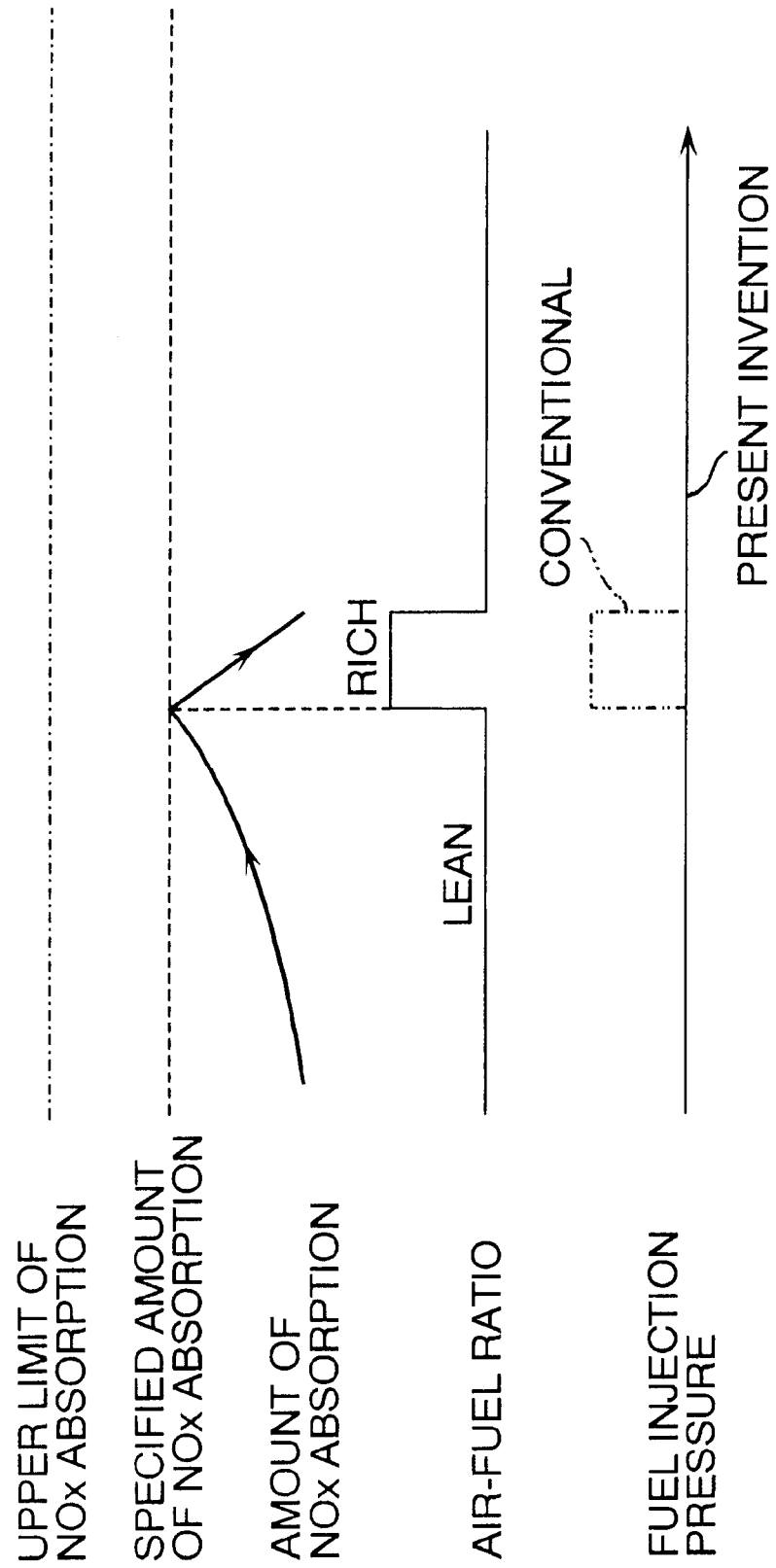
FIG. 10 is a time chart of rich spike combustion control.

Referring to FIG. 10, when an amount of NOx absorption reaches a specified amount, the homogeneous charge combustion in which an air-fuel ratio is rich is executed for a specified period of time, for example one to several seconds or until the amount of NOx absorption becomes zero (0) so as to cause the NOx absorbing material 40 to purge NOx for reduction with unburned HC and CO in an exhaust gas, thereby purifying the exhaust gas (which is referred to as NOx purge combustion). In this instance, although the fuel injection pressure is conventionally raised so as to meet the homogeneous charge combustion upon an occurrence of an alteration of combustion mode to the homogeneous charge combustion, nevertheless, in this embodiment, the fuel injection pressure remains unchanged in spite of an alteration of combustion mode to the homogeneous charge combustion so that no time delay in changing the fuel injection pressure occurs when the stratified charge combustion resumes after the NOx absorbing material 40 has purged the NOx. As a result, it is depressed that a local concentration of a fuel mixture around the spark plug 16 becomes hard to occur 16 at the beginning of resumption of the stratified charge combustion.

In this instance, however, in view of preventing an occurrence of torque shock upon an alteration to the homogeneous charge combustion (i.e. the NOx purge combustion), it is desirable to delay an ignition timing temporarily. Furthermore, it is desirable to advance an ignition timing, to reduce the amount of exhaust gas that is recirculated, or to rises a fuel injection pressure to, for example, a pressure higher than a level during execution of the stratified charge combustion but lower than a level during execution of the homogeneous charge combustion, in an extent allowed for the stratified charge combustion even during execution of the homogeneous charge combustion (i.e. the NOx purge combustion) in consideration of the fact that the combustibility of fuel is deteriorated due to a drop in the fuel injection pressure during the homogeneous charge combustion.

The following description will be directed to the fuel pressure control according to the above embodiment of the present invention with reference to FIGS. 10A and 10B.

Figure 11A:
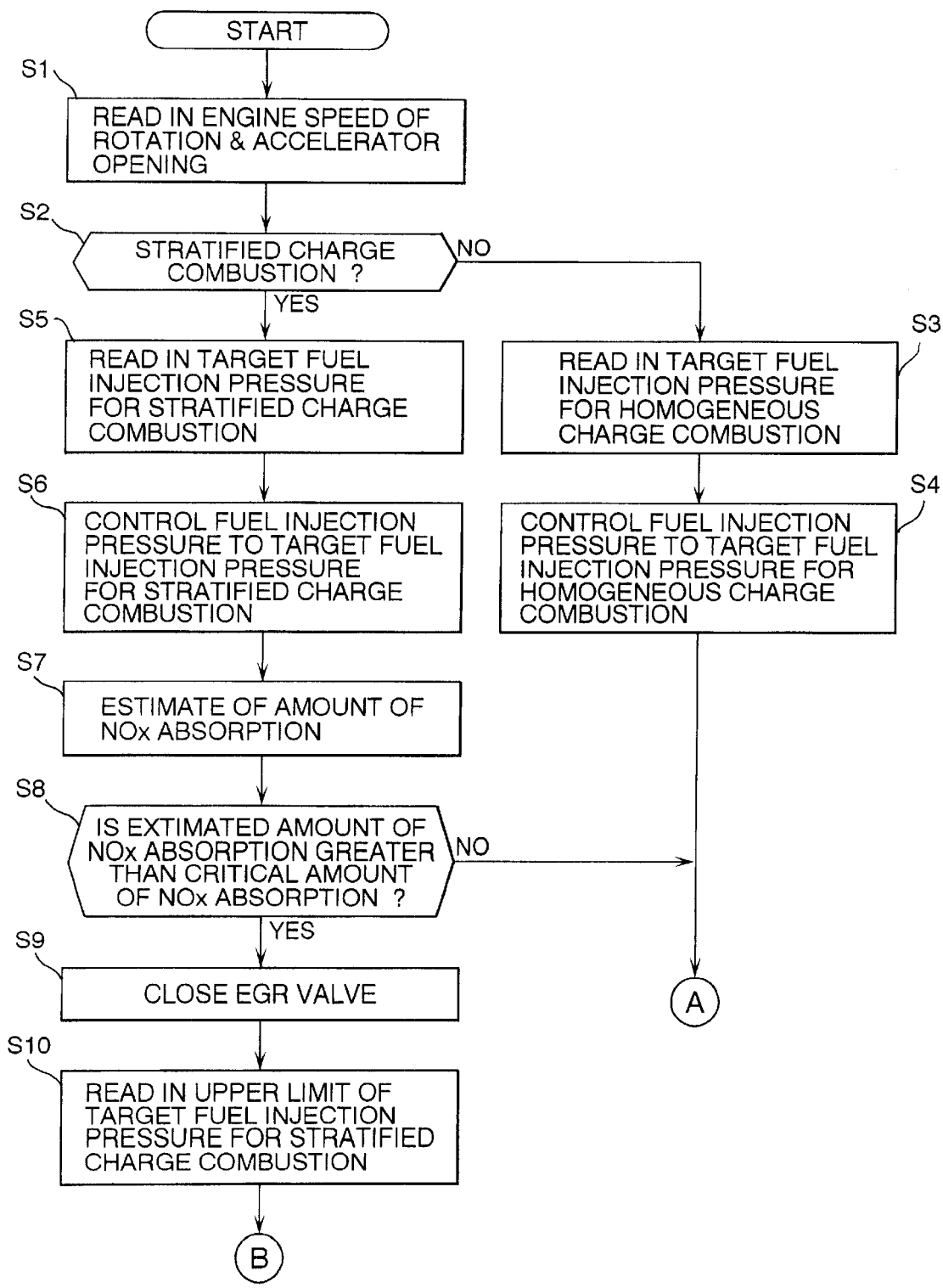
FIGS. 11A and 11B are respective parts of a flow chart illustrating a sequence routine of duel injection pressure control.
Figure 11B:
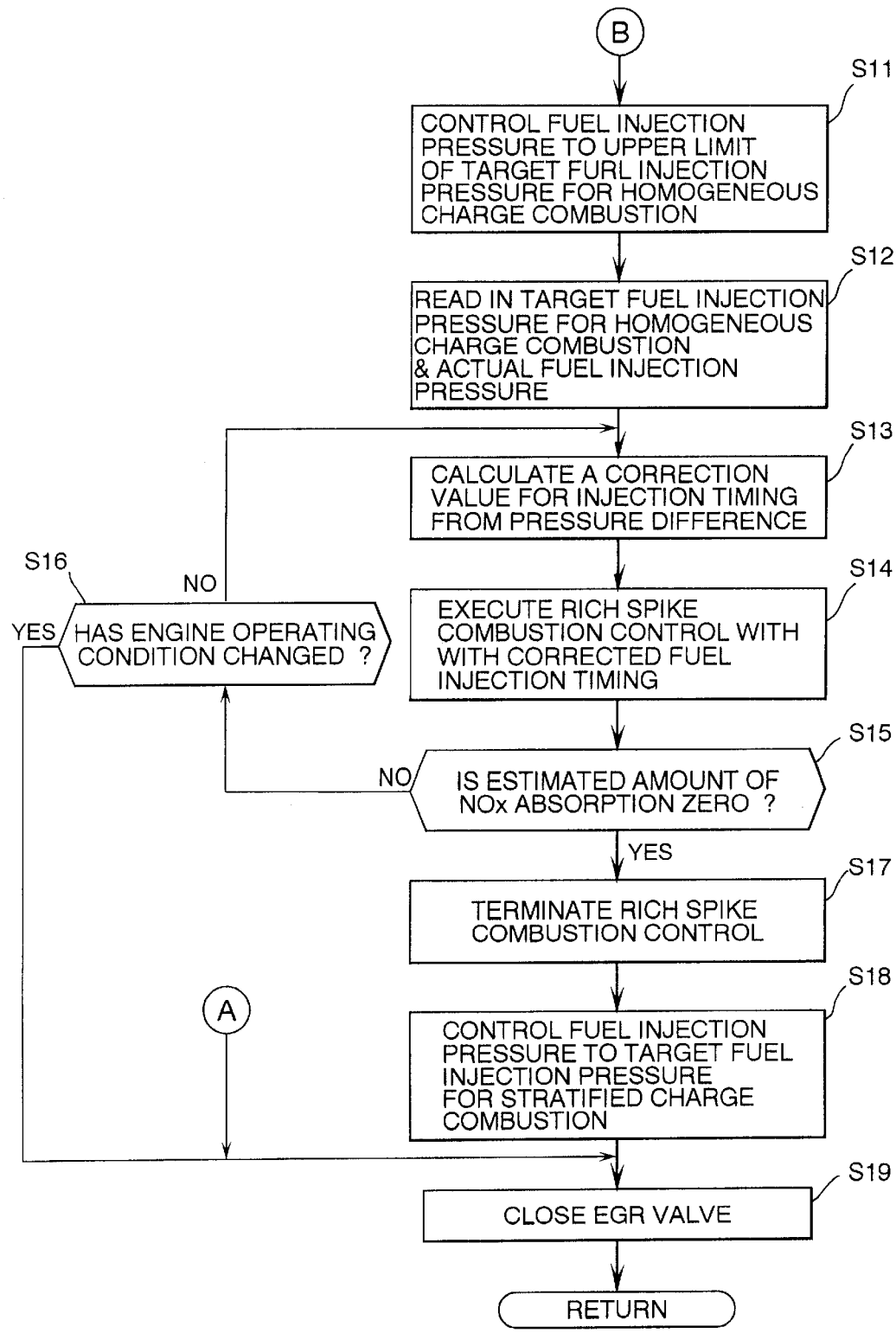

Referring to FIGS. 11A and 11B showing respective parts of a sequence routine of the fuel pressure control, when the sequence logic commences and control proceeds to a function block at step S1 where at least an engine speed and an accelerator opening are read in. Subsequently, a judgment is made at step S2 as to whether an engine operating condition is in the stratified charge combustion region. When the answer is negative, this indicates that the engine operating condition is in the homogeneous charge combustion range, then, after reading in a target fuel injection pressure, for example 7 MPs in this embodiment, for the homogeneous charge combustion range at step S3, the fuel pressure control is executed so that the fuel injector 18 sprays fuel at the target fuel injection pressure at step S4 and then the sequence logic orders return for repeating the sequence routine. On the other hand, when the answer is affirmative, this indicates that the engine operating condition is in the stratified charge combustion range, then, after reading in a target fuel injection pressure for the stratified charge combustion at step S5, the fuel injection pressure is controlled to the target fuel injection pressure at step S6.

Thereafter, an estimate is made to determine the amount of NOx absorption at step S7. This estimate of the amount of NOx absorption may be done using a conventional integrating counter that adds a specified value as a NOx increment every specified period of time while an air-fuel ratio is lean and reduces the specified value as a NOx decrement every specified period of time while an air-fuel ratio is rich or equal to the stoichiometric air-fuel ratio so as thereby to estimate a cumulative amount of NOx. In order to increase the accuracy of the estimate, it is effective to take a temperature of the NOx absorbing material 40, an amount of unburned HC and CO in an exhaust gas into consideration.

After the estimate of the amount of NOx absorption, a judgment is made at step S8 as to whether the estimated amount of NOx absorption is greater than a specified amount of NOx absorption as a critical value for execution of releasing (purging) NOx. In this embodiment, NOx is purged and reduced when the critical amount of NOx absorption is reached in order for the NOx absorbing material 40 to appropriately achieve its essential effect. When the answer is negative, this indicates that it is unnecessary for the NOx absorbing material 40 to purge NOx, then, the sequence logic orders return for repeating the sequence routine. On the other hand, when the answer is affirmative, this indicates that it is necessary for the NOx absorbing material 40 to purge NOx, then, the EGR valve 44 is closed at step S9. Closing the EGR valve 44 is done in order to remove of an exhaust gas recirculation so as thereby to control deterioration of the combustibility of fuel in consideration of an event where the fuel injection pressure is not risen sufficiently to meet a demand fuel injection pressure of the homogeneous charge combustion upon execution of the NOx purge combustion at later step S14 for releasing (purging) NOx by executing the homogeneous charge combustion with a rich air-fuel ratio. The EGR valve 44 may be fully closed so as to remove completely an exhaust gas recirculation or may be partly closed in relation to fuel injection pressure at which the fuel injector 18 sprays fuel so as to reduce the amount of exhaust gas that is recirculated.

Subsequently, after reading in an upper limit of target fuel injection pressure, that is desirably, for example, less than 7 Mpa, for the stratified charge combustion at step S10, the fuel injection pressure is controlled to the upper limit of target fuel pressure at step S11. Further, after reading in a target fuel injection pressure for the homogeneous charge combustion and an actual fuel injection pressure at step S12, a calculation is made to determine a correction value for a timing of activation of the fuel injector 18 on the basis of a difference of the actual fuel injection pressure from the target fuel injection pressure fort the homogeneous charge combustion at step S13. This correction value for the injector activation timing is given in order to control deterioration of the combustibility of fuel due to that the fuel injection pressure is limited to the upper limit of target fuel injection for the stratified charge combustion (see step S11) upon execution of NOx purge and NOx reduction. In this instance. The actual fuel injection pressure may be represented by the target fuel injection pressure for the stratified charge combustion or may be practically detected using a pressure sensor.

At step S14, the fuel injector 18 is activated at the corrected activation timing (for example at an activation timing advanced greater with an increase in the pressure difference), so as to execute the homogeneous charge combustion with a rich air-fuel ratio, i.e. the rich spike combustion. As a result of the rich spike combustion, NOx cumulated in the NOx absorbing material 40 is purged and reduced with unburned HC and CO in the exhaust gas. The rich spike combustion is continued until the estimated amount of NOx absorption becomes 0 (zero) as long as a significant change occurs in engine operating condition. Specifically, a judgment is made at step S15 as to whether the estimated amount of NOx absorption has become 0 (zero). When the answer is negative, this indicates some part of NOx remains still cumulated in the NOx absorbing material 40, then another judgment is made at step S16 as to whether there has occurred a significant change in engine operating condition. As long as the engine operating condition remains significantly unchanged, the rich spark combustion is continued. When the engine operating condition has significantly charged, the sequence logic orders return for another sequence routine. On the other hand, when the answer to the decision turns affirmative, this indicates that NOx has completely purged, then, after terminating the rich spike combustion, in other words resuming the stratified charge combustion, at step S17, the fuel injection pressure is controlled to the target fuel injection pressure for the stratified charge combustion at step S18 and the EGR valve 44 is subsequently controlled to an ordinary opening suitable for the stratified charge combustion at step S19. This is because it is not necessary to take improvement of the combustibility of fuel into consideration during the stratified charge combustion. In this instance, a time delay in changing the fuel injection pressure is insignificant when varying the fuel injection pressure to an ordinary target fuel injection pressure for the stratified charge combustion from the upper limit of target fuel injection pressure for the stratified charge combustion unlikely when varying the fuel injection pressure from the target fuel injection pressure for the homogeneous charge combustion. This is because the change in fuel injection pressure occurs in the same region of engine operating condition for the stratified charge combustion. Accordingly, upon return to the stratified charge combustion from the homogeneous charge combustion that is executed in order to purge NOx from the NOx absorbing material 40, it is controlled that a fuel mixture is put hard to concentrate locally around the spark plug 16.

The present invention has been described with reference to preferred embodiments thereof. However, it will be appreciated that variants and other embodiments can be effected by person of ordinary skill in the art without departing from the scope of the invention.

What is claimed is:

1. An engine control system for controlling an internal combustion engine of a type that fuel injection means sprays fuel directly into a combustion chamber, said engine control system comprising:

fuel injection pressure control means for controlling a pressure of fuel that said fuel injection means sprays;

intake air regulation means disposed in an intake line for regulating an amount of intake air that is introduced into said intake line;

NOx absorption means disposed in an exhaust line for absorbing NOx in an exhaust gas at a high oxygen concentration and releasing said NOx in an exhaust gas at a low oxygen concentration;

speed monitoring means for monitoring an engine speed of rotation of said internal combustion engine; and control means for controlling said fuel injection means and said fuel injection pressure control means on the basis of said engine speed of rotation;

said control means controlling said fuel injection means on the basis of said engine speed of rotation so as to perform homogeneous charge combustion by spraying fuel into said combustion chamber in an intake stroke of a cylinder when said engine speed of rotation is higher than a specified speed of rotation and to perform stratified charge combustion by spraying fuel into said combustion chamber in a compression stroke of said cylinder when said engine speed of rotation is lower than said specified speed of rotation;

controlling at least one of said fuel injection means and said intake air regulation means to change an air-fuel ratio during execution of said homogeneous charge combustion so as to provide a rich state wherein an oxygen concentration of an exhaust gas is smaller than that when an air-fuel ratio is equal or nearly equal to a stoichiometric air-fuel ratio;

controlling said fuel injection pressure control means to control said pressure of fuel according to said engine speed of rotation when said stratified charge combustion is executed and to bring said pressure of fuel to a fixed pressure higher than a pressure of fuel with which said stratified charge combustion is executed when said homogeneous charge combustion is executed;

estimating an amount of NOx absorbed in said NOx absorption means;

controlling said fuel injection means so as to spray fuel suitably for said homogeneous charge combustion for a specified period of time when it is judged that said amount of NOx has reached a specified amount of NOx during execution of said stratified charge combustion; and controlling said fuel injection pressure control means so as to bring said pressure of fuel provided during execution of said homogeneous charge combustion resulting from said judgment lower than said pressure of fuel provided during execution of said homogeneous charge combustion on the basis of said engine speed of rotation.

2. An engine control system as defined in claim 1, wherein said control means controls said fuel injection pressure control means so as to hold said pressure of fuel provided during execution of said homogeneous charge combustion resulting from said judgment at a pressure level during execution of said stratified charge combustion immediately before an alteration to said homogeneous charge combustion.

3. An engine control system as defined in claim 1, wherein, during execution of said homogeneous charge combustion resulting from said judgment, said control means controls said fuel injection means so as to correct a fuel injection timing at which said fuel injection means sprays fuel according to a pressure difference of said pressure of fuel provided during execution of said homogeneous charge combustion resulting from said judgment from said pressure of fuel provided during execution of said homogeneous charge combustion on the basis of said engine speed of rotation from.

4. An engine control system as defined in claim 3, wherein said control means correctively advance said fuel injection timing more as said pressure difference becomes larger.

5. An engine control system as defined in claim 1, and further comprising an intake line, an exhaust line, an exhaust gas recirculation line interconnecting said intake line and said exhaust line, and exhaust gas recirculation control means, wherein said control means controls said exhaust gas recirculation control means so as to bring an amount of exhaust gas that is recirculated during execution of said homogeneous charge combustion resulting from said judgment smaller than an amount of exhaust gas that is recirculated during execution of said homogeneous charge combustion on the basis of said engine speed of rotation.

6. An engine control system as defined in claim 5, wherein said control means controls said exhaust gas recirculation control means so as to bring an amount of exhaust gas that is recirculated during execution of said homogeneous charge combustion resulting from said judgment to zero.

7. An engine control system as defined in claim 1, wherein said control means controls said fuel injection means so as to provide said pressure of fuel during execution of said homogeneous charge combustion resulting from said judgment higher than said pressure of fuel provided during execution of said stratified charge combustion.

8. An engine control system for controlling an internal combustion engine of a type that fuel injection means sprays fuel directly into a combustion chamber, said engine control system comprising:

fuel injection pressure control means for controlling a pressure of fuel that said fuel injection means sprays;

intake air regulation means disposed in an intake line for regulating an amount of intake air that is introduced into said intake line;

NOx absorption means disposed in an exhaust line for absorbing NOx in an exhaust gas at a high oxygen concentration and releasing said NOx in an exhaust gas at a low oxygen concentration;

speed monitoring means for monitoring an engine speed of rotation of said internal combustion engine; and control means for controlling said fuel injection means and said fuel injection pressure control means on the basis of said engine speed of rotation;

said control means controlling said fuel injection means on the basis of said engine speed of rotation so as to perform homogeneous charge combustion by spraying fuel into said combustion chamber in an intake stroke of a cylinder when said engine speed of rotation is higher than a specified speed of rotation and to perform stratified charge combustion by spraying fuel into said combustion chamber in a compression stroke of said cylinder when said engine speed of rotation is lower than said specified speed of rotation;

controlling at least one of said fuel injection means and said intake air regulation means to change an air-fuel ratio during execution of said homogeneous charge combustion so as to provide a rich state wherein an oxygen concentration of an exhaust gas is smaller than that when an air-fuel ratio is equal or nearly equal to a stoichiometric air-fuel ratio;

controlling said fuel injection pressure control means to control said pressure of fuel according to said engine speed of rotation when said stratified charge combustion is executed and to establish said pressure of fuel according to an amount of fuel injection and a period of time for which fuel injection can be made when said homogeneous charge combustion is executed;

estimating an amount of NOx absorbed in said NOx absorption means;

controlling said fuel injection means so as to hold said pressure of fuel provided during execution of said homogeneous charge combustion resulting from said judgment at a pressure level during execution of said stratified charge combustion immediately before an alteration to said homogeneous charge combustion.

9. An engine control system for controlling an internal combustion engine, said engine control system comprising:

a fuel injector operative to spray fuel directly into a combustion chamber of said internal combustion engine;

a pressure regulator operative to regulate a pressure of fuel that said fuel injector sprays;

a throttle valve disposed in an intake line that operates to regulate an amount of intake air that is introduced into said intake line;

a NOx absorption material disposed in an exhaust line that operates to absorb NOx in an exhaust gas at a high oxygen concentration and to purge said NOx in an exhaust gas at a low oxygen concentration;

a speed sensor operative to detect an engine speed of rotation of said internal combustion engine; and a control unit operative to control said fuel injector and said pressure regulator on the basis of said engine speed of rotation;

said control unit controlling said fuel injector on the basis of said engine speed of rotation so as to perform homogeneous charge combustion by spraying fuel into said combustion chamber in an intake stroke of a cylinder when said engine speed of rotation is higher than a specified speed of rotation and to perform stratified charge combustion by spraying fuel into said combustion chamber in a compression stroke of said cylinder when said engine speed of rotation is lower than said specified speed of rotation;

controlling at least one of said fuel injector and said throttle valve to change an air-fuel ratio during execution of said homogeneous charge combustion so as to provide a rich state wherein an oxygen concentration of an exhaust gas is smaller than that when an air-fuel ratio is equal or nearly equal to a stoichiometric air-fuel ratio;

controlling said pressure regulator to control said pressure of fuel according to said engine speed of rotation when said stratified charge combustion is executed and to bring said pressure of fuel to a fixed pressure higher than a pressure of fuel with which said stratified charge combustion is executed when said homogeneous charge combustion is executed;

estimating an amount of NOx absorbed in said NOx absorption material;

controlling said fuel injector so as to spray fuel suitably for said homogeneous charge combustion for a specified period of time when it is judged that said amount of NOx has reached a specified amount of NOx during execution of said stratified charge combustion; and controlling said pressure regulator so as to bring said pressure of fuel provided during execution of said homogeneous charge combustion resulting from said judgment lower than said pressure of fuel provided during execution of said homogeneous charge combustion on the basis of said engine speed of rotation.

* * * * *